(12) United States Patent
Duckworth et al.

(10) Patent No.: US 12,297,326 B2
(45) Date of Patent: May 13, 2025

(54) COPOLYMERS, THEIR PREPARATION AND USE

(71) Applicant: VICTREX MANUFACTURING LIMITED, Thornton Cleveleys (GB)

(72) Inventors: Chantelle Duckworth, Thornton Cleveleys (GB); Don Thomas, Thornton Cleveleys (GB); Jack Atkin, Thornton Cleveleys (GB); Jason Bell, Thornton Cleveleys (GB); John Grasmeder, Thornton Cleveleys (GB); Nigel Slater, Thornton Cleveleys (GB); Oliver Carrdus, Thornton Cleveleys (GB); Samuel Lowe, Thornton Cleveleys (GB); Stuart Fenton, Thornton Cleveleys (GB); William Greene, Thornton Cleveleys (GB); Adam Chaplin, Thornton Cleveleys (GB)

(73) Assignee: VICTREX MANUFACTURING LIMITED, Thornton Cleveleys (GB)

( * ) Notice: Subject to any disclaimer, the term of this patent is extended or adjusted under 35 U.S.C. 154(b) by 170 days.

(21) Appl. No.: 18/005,531

(22) PCT Filed: Jun. 22, 2021

(86) PCT No.: PCT/GB2021/051582
§ 371 (c)(1),
(2) Date: Jan. 13, 2023

(87) PCT Pub. No.: WO2022/013520
PCT Pub. Date: Jan. 20, 2022

(65) Prior Publication Data
US 2023/0257505 A1  Aug. 17, 2023

(30) Foreign Application Priority Data

Jul. 15, 2020 (GB) ........................ 2010909
Jan. 8, 2021 (GB) ........................ 2100274
Jan. 8, 2021 (GB) ........................ 2100282

(51) Int. Cl.

| | |
|---|---|
| *B29C 64/118* | (2017.01) |
| *B33Y 70/00* | (2020.01) |
| *C08G 8/02* | (2006.01) |
| *C08G 65/40* | (2006.01) |
| *C08L 27/12* | (2006.01) |
| *C08L 71/10* | (2006.01) |
| *B29C 64/153* | (2017.01) |
| *B29K 71/00* | (2006.01) |
| *B29K 105/00* | (2006.01) |
| *B33Y 10/00* | (2015.01) |

(52) U.S. Cl.
CPC .............. *C08G 8/02* (2013.01); *B33Y 70/00* (2014.12); *C08G 65/4012* (2013.01); *C08G 65/4093* (2013.01); *B29C 64/153* (2017.08); *B29K 2071/00* (2013.01); *B29K 2105/0085* (2013.01); *B33Y 10/00* (2014.12); *C08G 2650/40* (2013.01)

(58) Field of Classification Search
CPC . B29C 64/118; B29C 64/153; B29K 2071/00; B29K 2105/0085; B33Y 10/00; B33Y 70/00; C08G 65/40; C08G 65/4012; C08G 65/4093; C08G 2650/40; C08L 27/12; C08L 71/10
USPC ................... 264/308, 331.11, 497; 525/471; 528/125, 219
See application file for complete search history.

(56) References Cited

U.S. PATENT DOCUMENTS

| | | | |
|---|---|---|---|
| 2016/0152769 A1* | 6/2016 | Wilson ................. | C08G 65/40 528/125 |
| 2017/0057163 A1* | 3/2017 | Chaplin ............. | C08G 65/4012 |
| 2017/0218199 A1* | 8/2017 | Chaplin ............. | C08G 65/4012 |
| 2018/0282542 A1* | 10/2018 | Chaplin ............. | C08G 65/4012 |

FOREIGN PATENT DOCUMENTS

| | | |
|---|---|---|
| EP | 0001879 A1 | 5/1979 |
| EP | 0182648 A2 | 5/1986 |
| EP | 0184452 A2 | 6/1986 |
| EP | 0244167 A1 | 11/1987 |
| EP | 3502163 A1 | 6/2019 |
| GB | 2542704 A | 3/2017 |
| JP | H01198624 A | 8/1989 |
| JP | H01221426 A | 9/1989 |
| WO | WO 2004/088778 A2 | 10/2004 |
| WO | WO 2014/207458 A1 | 12/2014 |

(Continued)

OTHER PUBLICATIONS

Ben-Haida et al., "Synthesis of a Catechol-Based Poly(ether ether ketone) ("o-PEEK") by Classical Step-Growth Polymerization and by Entropically Driven Ring-Opening Polymerization of Macrocyclic Oligomers" Macromolecules 2006, 39: 6467-6472.

(Continued)

*Primary Examiner* — Leo B Tentoni
(74) *Attorney, Agent, or Firm* — Casimir Jones, S.C.; Anne M. Reynolds

(57) ABSTRACT

This invention relates to copolymers which consist essentially of [-ether-phenyl-ether-phenyl-carbonyl-phenyl-]and [ether-phenyl-phenyl-ether-phenyl-carbonyl-phenyl-] repeat units, as well as end units, which have reduced melting temperature (Tm) compared to prior art copolymers including such repeat units. The copolymers of the invention exhibit crystallinity and have similar glass transition temperatures to the prior art polymers.

19 Claims, 2 Drawing Sheets

(56) References Cited

FOREIGN PATENT DOCUMENTS

Figure 1:
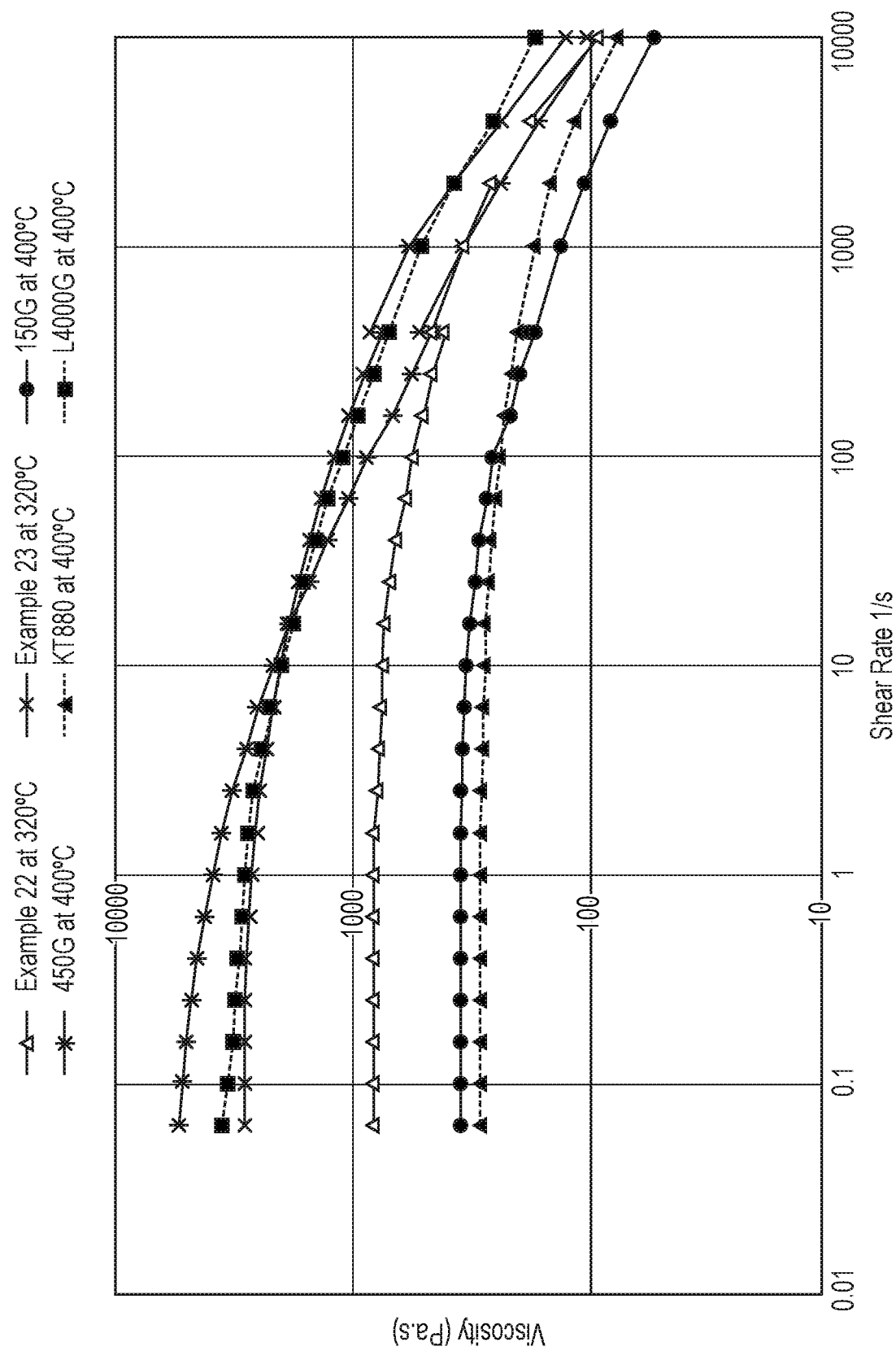

| WO | WO 2015/044640 A1 | 4/2015 | | |
|----|----|----|----|----|
| WO | WO 2016/092087 A1 | 6/2016 | | |
| WO | WO 2017/153290 A1 | 9/2017 | | |
| WO | WO 2018/0024744 A1 | 2/2018 | | |
| WO | WO 2019/186085 A1 | 3/2018 | | |
| WO | WO-2018055384 A1 * | 3/2018 | ......... | C08G 65/4012 |
| WO | WO 2018/086873 A1 | 5/2018 | | |
| WO | WO 2019/053164 A1 | 3/2019 | | |
| WO | WO 2019/122143 A1 | 6/2019 | | |
| WO | WO 2019/122226 A1 | 6/2019 | | |
| WO | WO 2020/141329 A1 | 7/2020 | | |

OTHER PUBLICATIONS

International Search Report and Written Opinion mailed Oct. 12, 2021, Intl. Appl. No. PCT/GB2021/051582, 12 pages.

Lee et al., "Structure and Properties of Poly(arylene etherketone)s Containing Resorcinol Units" Journal of the Korean Fiber Society, Oct. 28, 1992, 30(1): 50-64.

Rao et al., "Synthesis, characterization and thermal degradation studies of poly (ether ether ketone) copolymers" Polymer 1992, 33(13): 2834-2839.

* cited by examiner

COPOLYMERS, THEIR PREPARATION AND USE

This invention relates to copolymers which consist essentially of [-ether-phenyl-ether-phenyl-carbonyl-phenyl-]and [ether-phenyl-phenyl-ether-phenyl-carbonyl-phenyl-] repeat units, as well as end units, which have reduced melting temperature (Tm) compared to prior art copolymers including such repeat units. The copolymers of the invention exhibit crystallinity and have similar glass transition temperatures to the prior art polymers.

There are many thermoplastic polymeric materials available for use in industry, either used as the sole material for manufacture of components, or used as part of a composite material, for instance a polymer/fibre composite used in the manufacture of components. However, there is still a need for thermoplastic polymeric materials with properties that are improved in at least some respect over existing thermoplastic polymeric materials.

Polyaryletherketones (PAEKs) such as polyetheretherketone (PEEK), which is a homopolymer with [-ether-phenyl-ether-phenyl-carbonyl-phenyl-] repeat units, are often used as high performance thermoplastic polymers. PEEK is the material of choice for many commercial applications because it forms a highly crystalline solid, when solidified from the melt, with outstanding mechanical and chemical resistance properties. PEEK melts at about 343° C. and has a Tg of about 143° C.

PAEK polymers or copolymers, unlike many conventional polymers, can be obtained in either amorphous or crystalline form as a direct result of the way that the polymer is treated. A glassy or amorphous state is achieved by rapidly quenching the polymer from the melt to below Tg, whereas slow-cooling the polymer from the melt will allow crystallinity to develop in the sample (melt crystallisation). The crystalline form of the polymer can also be obtained from the polymer in its amorphous state, for instance at room temperature, by heating the polymer to a temperature higher than Tg but less than Tm (cold crystallisation) prior to cooling back to room temperature, or by holding the polymer at a constant temperature between Tg and Tm for a length of time (isothermal crystallisation) prior to cooling back to room temperature.

PAEKs, particularly including PEEK, can be manufactured by nucleophilic polycondensation of bisphenols with organic dihalide compounds in a suitable solvent in the presence of alkali metal carbonates and/or bicarbonates or alkaline earth metal carbonates and/or bicarbonates. Such processes are set out, for example, in EP0001879A, EP0182648A, EP0244167A and EP3049457A.

Copolymers of PEEK and PEDEK are disclosed in EP0184452A, which describes a polymer containing [-ether-phenyl-ether-phenyl-carbonyl-phenyl-] (i.e. $R_{PEEK}$) repeat units and [-ether-phenyl-phenyl-ether-phenyl-carbonyl-phenyl-] (i.e. $R_{PEDEK}$) repeat units. The PEEK-PEDEK copolymer is disclosed as having similar chemical resistance and mechanical properties to PEEK, but also as having a lower Tm than PEEK, but a similar or higher Tg value than PEEK.

WO 2014/207458 A1 discloses PEEK-PEDEK copolymer manufactured by a process comprising polycondensing a mixture of at least one dihydroxybenzene compound and at least one dihydroxybiphenyl compound in the molar proportions 65:35 to 95:5 with at least one dihalobenzophenone in the presence of sodium carbonate and potassium carbonate, where the mole % of potassium carbonate, used in the synthesis of the PEEK-PEDEK copolymer by nucleophilic polycondensation, is at least 2.5, where the mole % of potassium carbonate is expressed as a percentage of the total number of moles of the hydroxy monomers used in the synthesis. The PEEK-PEDEK copolymers of WO 2014/207458 A1 have higher crystallinity of the resulting PEEK-PEDEK copolymer compared to that disclosed for the copolymers of EP0184452A.

WO 2019/186085 A1 discloses PEEK-PEDEK copolymers made by a specific nucleophilic polycondensation process including polymerisation-stopping (for instance using lithium salt) and end-capping of the copolymer (to provide specific end units to the copolymer), in the presence of reduced quantities of aromatic sulfone solvent, to provide PEEK-PEDEK copolymers with reduced chain branching and reduced melt viscosity at low shear rates compared to prior art copolymers of comparable molecular mass.

Polyphenylene sulphide (PPS) is another known thermoplastic polymeric material which has a lower melting temperature (Tm) than PEEK, specifically about 290° C. However, the glass transition temperature (Tg) for PPS is 85° C. to 100° C. which is too low for many applications. Polyetheretherketone (PEEK) has a suitably high Tg of 143° C. to enable its use for high temperature applications without loss of crystallinity, but its Tm of 343° C. is much higher than desirable because of the high temperatures needed to process the PEEK in its molten state where typically temperatures in the range 370° C. to 420° C. may be needed. Nonetheless, PEEK is the material of choice for many commercial applications because of its tendency to form a highly crystalline structure with outstanding chemical resistance and mechanical properties.

WO2019/122226 A1 discloses PEEK-PEmEK copolymers having $R_{PEEK}$ repeat units:

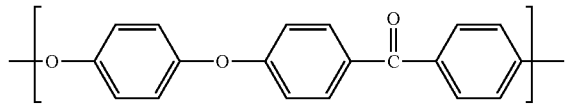

and $R_{PEmEK}$ repeat units:

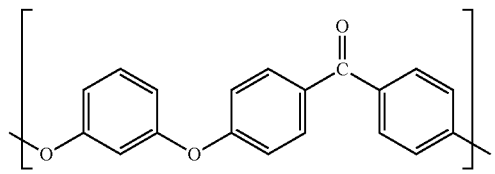

in a molar ratio $R_{PEEK}/R_{PEmEK}$ from 95/5 to 45/55. These are said to provide a relationship between melting temperature Tm and heat of fusion (ΔH) satisfying the equality:

$$\Delta H \geq -0.00005(Tm)^2 + 1.008(Tm) - 226.33$$

In the Examples of WO2019/122226 A1, as the ratio $R_{PEEK}/R_{PEmEK}$ varies from 95/5 to 50/50, Tm decreases from 333 to 253° C., and Tg falls from 154 to 129° C. whilst ΔH drops from 60 to 3 J/g. This may be compared to Tm of 339° C., Tg of 149° C. and ΔH of 49 J/g for PEEK, according to WO2019/122226 A1.

The term $R_{PEmEK}$ refers to the two ether linkages being attached to the same phenyl group in a "meta-" configuration (1,3) in the repeat unit, whereas for $R_{PEEK}$ the two ether linkages are attached to the same phenyl group in a "para-" configuration (1,4) in the repeat unit.

WO2019/122226 A1 also discloses that the PEEK-PEmEK copolymer may include repeat units $R_{PAEK}$ different from the repeat units $R_{PEEK}$ and $R_{PEmEK}$, specifically comprised between 0.1 and 5 mol % with respect to the total number of moles of repeat units of PEEK-PEmEK copolymer. $R_{PAEK}$ units are listed as K-A to K-M, but none of the disclosed additional repeat units corresponds to a $R_{PEDEK}$ repeat unit.

There is a need for further high performance PAEK polymers with reduced melting temperature (Tm) compared to PEEK, but which have a high Tg, and which exhibiting crystallinity, giving mechanical strength and chemical resistance comparable to that of PEEK. There is also a need for further high performance PAEK polymers which have thermal decomposition temperatures similar to that of PEEK polymers, to permit recycling and reprocessing. There is also a need for methods to synthesise such polymers.

Such polymers of lower melting point Tm would result in easier melt processability, for instance because a lower process temperature may be employed, requiring less energy use and reduced risk of thermal degradation of the copolymer, provided that the polymer degradation temperature is not also reduced, so that the copolymer is also potentially more readily recyclable for multiple times. In order to ensure that the polymers are at least as recyclable and re-processable as prior art polymers such as PEEK, the polymers should have a thermal decomposition temperature, Td5, similar to that of PEEK.

However, the maintenance of a high Tg for the polymer means that the polymer would still be useful for high temperature applications. It is desirable to maintain the polymer Tg as high as possible, as Tg represents the temperature above which the components made from the polymer may reduce in strength and exhibit reductions in chemical, fatigue and wear resistance. Crystallinity is also important for retention of properties at elevated temperatures and therefore it is the combination of high Tg and a reasonable level of crystallinity that result in desired material properties.

In addition, a lower processing temperature, arising from the reduced Tm, may permit the inclusion of additives into the copolymer prior to melt-processing, when such additives would degrade if blended with polymers or copolymers of higher Tm.

Throughout this specification, the term "comprising" or "comprises" means including the component(s) specified but not to the exclusion of the presence of other components.

The term "consisting essentially of" or "consists essentially of" means including the components specified but excluding other components except for materials present as impurities, unavoidable materials present as a result of processes used to provide the components, and components added for a purpose other than achieving the technical effect of the invention. Typically, when referring to compositions, a composition consisting essentially of a set of components will comprise less than 5% by weight, typically less than 3% by weight, more typically less than 1% by weight of non-specified components. When referring to the copolymer of the invention, the term "consisting essentially" means that the copolymer chain has at least 95% by weight of only the specified repeat units and end units, with any other repeat units or end units present in the polymer chain arising typically from the presence of impurities in the monomers or further organic dihalide used in the manufacture of the copolymer. Deliberate inclusion of other monomers and/or end units up to 5% by weight may be permitted.

The final product from the manufacture of the copolymer of the invention, in addition to the copolymer itself, which consists essentially of the specified repeat units and end units, will also include, in addition to the polymer chains, certain reaction by-products from the manufacture, such as residual solvent, residual salts and residual monomer, as explained in more detail below. Hence, the use of the term "a copolymer consisting essentially of repeat units and end units" refers to the polymer itself, but it must be understood that the term encompasses the presence of residual by-products, along with the polymer chains, arising from the copolymer manufacture, present as up to say 5% by weight of the final product of manufacture, with the remaining 95% being the copolymer chains.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

As used herein, the term "nucleophilic condensation" is used to refer briefly to the process for preparation of PAEK, particularly PEEK-PEDEK copolymer, by nucleophilic polycondensation of bisphenols with organic dihalide compounds, in the presence of alkali and/or alkali earth metal carbonates and/or bicarbonates in the presence of an aromatic sulfone polymerisation solvent such as diphenyl sulfone (DPS).

References to the monomers, solvents and other additives of the nucleophilic condensation reaction are meant to refer to these compounds used with their commercially available purities, without need for further special purification.

A first aspect of the invention provides a copolymer consisting essentially of repeat units of formula I:

—O-Ph-O-Ph-CO-Ph-    I;

repeat units of formula II:

II

—O—⌬—⌬—O—⌬—C(=O)—⌬—;

and end units;

wherein the molar ratio of repeat units of formula I to repeat units of formula II is from 55:45 to 95:5; and wherein the repeat units of formula I consist essentially of 50 to 90 molar % of repeat units of formula III:

III

—O—⌬—O—⌬—C(=O)—⌬—;

and and 10 to 50% molar % of repeat units which are of formula IV, of formula V or of a mixture thereof;

wherein the repeat unit of formula IV is:

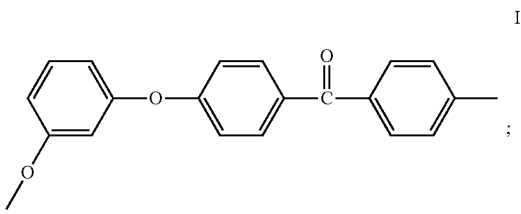

and the repeat unit of formula V is:

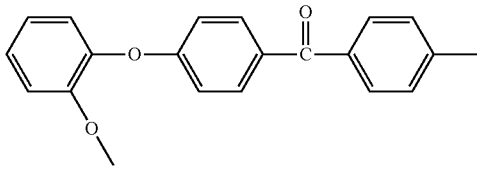

Preferably, the molar ratio of repeat units of formula I to repeat units of formula II is from 60:40 to 90:10, preferably from 70:30 to 90:10, more preferably from 80:20 to 90:10.

The repeat units of formula I consist essentially of, or preferably consist of, 50 to 90 molar % of repeat units of formula III in combination with 10 to 50 molar % of repeat units of formula IV and/or formula V. Preferably the repeat units of formula I consist essentially of, or preferably consist of, 65 to 90% molar % of repeat units of formula III in combination with 10 to 35 molar % of repeat units which are of formula IV, of formula V, or of a mixture thereof. More preferably, the repeat units of formula I consist essentially of, or preferably consist of, 80 to 90% molar % of repeat units of formula III in combination with 10 to 20 molar % of repeat units which are of formula IV, of formula V, or of a mixture thereof.

In this specification, the repeat units III are referred to as $R_{PEEK}$, the repeat units IV are referred to as $R_{mPEEK}$ and the repeat units V are referred to as $R_{oPEEK}$.

So, in other words, the repeat units of formula 1 have, expressed as molar proportions:

$R_{PEEK}:(R_{mPEEK}+R_{oPEEK})$ from 90:10 to 50:50, preferably from 90:10 to 65:35, more preferably from 90:10 to 80:20.

In a particularly preferred embodiment, the copolymer is a copolymer as described above wherein the molar ratio of repeat units of formula I to repeat units of formula II is from 90:10 to 80:20 and wherein the repeat units of formula I consist essentially of, or preferably consist of, 80 to 90% molar % of repeat units of formula III in combination with 10 to 20 molar % of repeat units which are of formula IV, of formula V, or of a mixture thereof.

It will be understood that formula I: —O-Ph-O-Ph-CO-Ph- provides no information concerning whether the ether linkages on the —O-Ph-O— moiety are arranged in para-, meta- or ortho-configuration, whereas this is specified for formulae III, IV and V, as are all other configurations within the repeat units.

In one embodiment, the copolymer according to the first aspect of the invention may be a copolymer which does not include repeat units of formula IV.

In another embodiment, the copolymer according to the first aspect of the invention may be a copolymer which does not include repeat units of formula V.

It will be understood that the use of only one of the repeat units IV or V leads to a simplification of the manufacturing process.

The copolymer of the first aspect of the invention will include end units in addition to the repeat units. The end units may be the same as the repeat units of the copolymer but terminated with a terminal —OH or halogen moiety, typically an —F moiety. This will be the case if no end-capping reagents are deliberately added to the reaction mixture when the polymer is polycondensed.

The copolymer of the first aspect of the invention may be end-capped so that the repeat units include

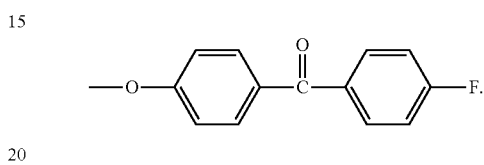

as end units in addition to end units which are the same as the repeat units of the copolymer but terminated with a terminal —OH or halogen, e.g. —F moiety. The end-capping process, as described below, may not necessarily lead to all end units being

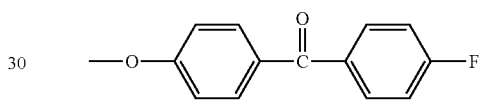

end units, but such end-capping can lead to improved thermal stability for the copolymer.

A second aspect of the invention provides process for producing the copolymer of the first aspect of the invention, the process comprising polycondensing 4,4' difluorobenzophenone with a mixture of dihydroxy compounds consisting of 1,4-dihydroxybenzene, 4,4'-dihydroxydiphenyl and at least one of 1,3-dihydroxybenzene and 1,2-dihydroxybenzene; wherein the dihydroxy compounds are in the molar proportions required to provide the copolymer of the first aspect of the invention;

wherein the molar ratio (4,4' difluorobenzophenone)/(dihydroxy compounds) is from 1.005 to 1.05; and wherein the polycondensation is carried out in an aromatic sulfone solvent in the presence of particulate sodium carbonate and potassium carbonate.

The reaction conditions required for nucleophilic polycondensation of PEEK-PEDEK copolymers, and for subsequent purification and solvent removal, are well known to the skilled person, and reference is made to EP0184452A, WO 2014/207458 and WO 2019/186085 A1.

In the process, sodium bicarbonate or a mixture of sodium bicarbonate and sodium carbonate may be considered as equivalent to sodium carbonate based upon providing the same molar equivalence of sodium ions to the reaction mixture. Similarly, potassium bicarbonate or a mixture of potassium bicarbonate and potassium carbonate may be considered as equivalent to potassium carbonate based upon providing the same molar equivalence of potassium ions to the reaction mixture.

The aromatic sulfone solvent used in the process may suitably be a solvent of formula

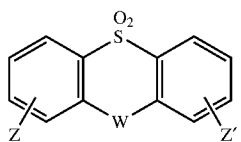

where W is a direct link, an oxygen atom or two hydrogen atoms (one attached to each benzene ring) and Z and Z', which may be the same or different, are hydrogen atoms or phenyl groups. A mixture of such solvents may be used. Examples of such aromatic sulfones include diphenylsulphone, dibenzothiophen dioxide, phenoxanthin dioxide and 4-phenylsulfonyl biphenyl. Diphenylsulphone is a preferred solvent. Step a of the process is preferably carried out in the presence of diphenylsulphone as solvent. Preferably, the aromatic sulfone solvent comprises 95% by weight or more of diphenylsulphone. More preferably, the aromatic sulfone solvent consists essentially of diphenylsulphone, by which it is meant that the solvent comprises at least 95% by weight of diphenylsulphone, preferably 98% by weight, more preferably 99% by weight.

The progress of the polycondensation may be monitored by measuring the torque applied to a reaction stirrer. As the copolymer molecular weight (degree of polymerisation) increases, the torque rises. The reaction may be terminated when a target torque is reached. Calibration curves of stirrer torque as a function of degree of polymerisation, such as measured by polymer MV, may be drawn up and used for subsequent reaction control.

Once a desired degree of polycondensation has been reached, the reaction may be terminated by the addition of a stopping agent to the reaction mixture. Typically, a salt such as lithium sulphate may be employed as a stopping agent.

Further organic dihalide may be used to provide end-capping (i.e. providing end-units) of the copolymer once the polycondensation reaction is deemed to be complete, or after stopping polycondensation using a stopping agent. The further organic dihalide may be selected from one or more of 4,4'-difluorobenzophenone or 4,4'-dichlorodiphenylsulphone, 1,3-Bis(4-fluorobenzoyl)benzene, 4,4'-dichlorobenzophenone, and 1,3-bis(4-chlorobenzoyl)benzene. The further organic dihalide used as end-capping agent is more preferably 4,4'-difluorobenzophenone. As a result of the addition of further organic dihalide end units of the copolymer may be terminated with halogen atoms, preferably fluorine atoms, which are understood to thermally stabilise the copolymer.

Hence, a preferred embodiment of the second aspect of the invention is a process wherein the polycondensation is stopped with lithium sulphate and wherein the copolymer is end-capped by addition of further 4,4'-difluorobenzophenone.

In another example of the3 second aspect, a further step is carried out. Once the desired degree of polycondensation has been reached, and if needed, the reaction is terminated by the addition of the stopping agent, an additive is added to the reaction mixture and stirred for at least five minutes. More preferably, the reaction mixture it stirred after addition of the additive for 15 minutes, or even more preferably, for at least 30 minutes.

In one example, the additive is a polyaryletherketone, PAEK, wherein the PAEK has a melting temperature of at least 20° C. above a melting temperature of the copolymer, as determined by Differential Scanning calorimetry as described in Example 33. More preferably, the PAEK has a melting temperature of at least 50° C., or even more preferably, at least 80° C. above the melting temperature of the copolymer.

The PAEK may be selected from the following group of PAEKs: polyetheretherketone, polyetherketone, polyether The melt viscosity (MV) used to assess polymer molecular weight (and hence extent of polycondensation) may be suitably measured, for the purified copolymer, at 400° C., and at a shear rate of $1,000s^{-1}$, using a Malvern Instruments Rosand RH10 capillary rheometer. The RH10 capillary rheometer is fitted with a tungsten carbide die, 0.5 mm (capillary diameter)×8.0 mm (capillary length). Approximately 5 grams of the copolymer is dried in an air circulating oven for 3 hours at 150° C. The extruder is allowed to equilibrate to 400° C. The dried polymer is loaded into the heated barrel of the extruder, a brass tip (12 mm long× 9.92±0.01 mm diameter) placed on top of the polymer followed by the piston and the screw manually turned until the proof ring of the pressure gauge just engages the piston to help remove any trapped air. The column of polymer is allowed to heat and melt over a period of at least 10 minutes. After the preheat stage the screw was is in motion so that the melted polymer is extruded through the die to form a thin fibre at the desired shear rate, while recording the pressure (P) required to extrude the polymer. The Melt Viscosity is given by the formula $$\text{Melt Viscosity} = \frac{P\pi r^4}{8LSA} kNsm^{-2}$$

where P=Pressure/kN $m^{-2}$
L=Length of die/m
S=ram speed/$ms^{-1}$
A=barrel cross-sectional area/$m^2$
r=Die radius/m
The relationship between shear rate and the other parameters is given by the equation:

$$\text{Apparent wall shear rate} = \frac{4Q}{\pi r 3}$$

where Q=volumetric flow rate/$m^3$ $s^{-1}$=SA.

Hence, by adjusting the ram speed, S, the viscosity of the molten polymer may be measured at different shear rates, such as at 100, 1000 or 10,000 $s^{-1}$.

The copolymer of the invention suitably has a melt viscosity (MV) measured at 400° C. by capillary rheometry, as set out above, and at an intermediate shear rate of 1000 $s^{-1}$, of at least 0.05 $kNsm^{-2}$, preferably at least 0.10 $kNsm^{-2}$, more preferably at least 0.15 $kNsm^{-2}$. The copolymer may have a melt viscosity measured at 1000 $s^{-1}$ of less than 1.20 $kNsm^{-2}$, suitably less than 1.00 $kNsm^{-2}$. The melt viscosity measured at 1000 $s^{-1}$ may be employed as a measure or indicator of the molecular mass of the polymer.

Additive layer manufacturing techniques include filament fusion, laser sintering, powder bed fusion, ThermoMELT™ and micro pellet fusion.

Powder bed fusion and filament fusion are examples of additive manufacturing processes, for which the copolymer of the invention is particularly useful. Powder bed fusion (alternatively known as laser sintering or selective laser sintering—SLS) involves using a laser to melt and fuse together polymer particles, as a building material for component formation, into a 3-dimensional component shape. There is no externally applied force to the powder (other than gravity) and the polymer, when molten, is therefore not subject to significant shear. Powder bed fusion is thus a low-shear process, so requires a polymer with a low viscosity under low-shear conditions in order for the polymer particles to coalesce. It may not be sufficient to achieve the viscosity requirement by simply using a lower molecular weight polymer, as a high molecular weight is preferred for high mechanical strength.

In filament fusion, a thin filament of polymer is extruded through a print-head, onto a base-plate in order to be used as a building material to build up a component layer by layer. Whilst the polymer may experience significant shear in the extruder head, the consolidation and fusion process that occurs outside of the print head, is a low-shear process. It is therefore desirable to have a polymer with a relatively low viscosity at low shear rates when the polymer is in a molten state. However, it is desirable to maintain the polymer molecular mass at a level that ensures good mechanical properties and toughness.

In view of the combination of low Tm with high Tg, low dynamic viscosity at low shear rates and the ability to crystallise, the copolymers of the invention are particularly useful as building materials for use in additive processes for the manufacture of components.

Hence, the invention also provides a method for manufacturing a three-dimensional component, from the copolymer of the first aspect of the invention, by additive layer manufacturing.

A further aspect of the invention provides the use of the copolymer of the first aspect of the invention as a building material in an additive manufacturing process.

In particular, the invention also provides a method for manufacturing a three-dimensional component from a powder by selective sintering by means of electromagnetic radiation, wherein the powder comprises, consists of essentially, or consists the copolymer according to the first aspect of the invention.

Also provided is the use of a powder comprising, consisting essentially of, or consisting of the copolymer according to the first aspect of the invention as a building material for manufacture of a three-dimensional component from the powder by selective sintering of the powder by means of electromagnetic radiation.

The copolymer of the first aspect of the invention may be compounded with one or more filler. The filler may include a fibrous filler or a non-fibrous filler. The filler may include both a fibrous filler and a non-fibrous filler. The fibrous filler may be continuous or discontinuous.

The fibrous filler may be selected from inorganic fibrous materials, non-melting and high-melting organic fibrous materials, such as aramid fibres, and carbon fibre.

The fibrous filler may be selected from glass fibre, carbon fibre, asbestos fibre, silica fibre, alumina fibre, zirconia fibre, boron nitride fibre, silicon nitride fibre, boron fibre, fluorocarbon resin fibre and potassium titanate fibre. Preferred fibrous fillers are glass fibre and carbon fibre. A fibrous filler may comprise nanofibers.

The non-fibrous filler may be selected from mica, silica, talc, hydroxyapatite (or hydroxylapatite), alumina, kaolin, calcium sulfate, calcium carbonate, titanium oxide, titanium dioxide, zinc sulfide, ferrite, clay, glass powder, zinc oxide, nickel carbonate, iron oxide, quartz powder, magnesium carbonate, fluorocarbon resin, graphite (including graphite nanoplatelets and graphene), carbon black, carbon powder, nanotubes (e.g. carbon nanotubes) and/or barium sulfate. The non-fibrous fillers may be introduced in the form of powder or flaky particles.

Preferably, the filler, if present, may comprise or is one or more fillers selected from glass fibre, carbon fibre, aramid fibres, carbon black and a fluorocarbon resin. More preferably, the filler comprises or is glass fibre or carbon fibre. Such filler preferably comprises or is glass fibre.

A filled copolymer composition as described may include, or consist essentially of, or consist of at least 20 wt %, or at least 40 wt % of filler. The filled composition may include, or consist essentially of, or consist of 70 wt % or less or 60 wt % or less of filler.

The invention also provides a component which comprises, consists essentially of, or consists of a copolymer according to the first aspect of the invention, or of a filled copolymer composition as described above. The component may, for instance, be a film, a stock shape such as a rod, or a machined component. The component may be an injection moulded component, a compression moulded component or an extruded component. Alternatively, the component may be formed using an additive manufacturing technique.

The invention also provides a film or tape formed of a composition comprising or consisting of the copolymer according to the first aspect of the invention. The film may be extruded and may have a thickness from 5 µm to 100 µm or preferably from 5 µm to 50 µm.

The copolymer of the invention is of particular use for the preparation of formed and moulded enclosures for electronic devices, particularly portable electronic devices which may be easily dropped, for instance portable smartphones and tablets.

For example, a casing for an electronic device form a composition comprising, substantially consisting of or consisting of the copolymer of the first aspect of invention is provided. A casing for an electronic device includes an enclosure for a portable device such as a smart phone. The enclosure may be a moulded enclosure. Alternatively, the enclosure may be formed through an additive manufacturing process. An enclosure comprising, substantially consisting of or consisting of the copolymer of the present invention is particularly good at withstanding the stresses and strains of prolonged everyday use because the copolymer of the present invention has a high resistance to brittle fracture. Furthermore, enclosures comprising PEEK-PEDEK copolymer of the present invention are more able to withstand defects formed during manufacture of the enclosures, since small manufacturing defects can cause cracks that can propagate through the enclosures, and the copolymer of the present invention is resistant to brittle fracture.

The composition of the casing may comprise from 30 to 100% of the copolymer of the first aspect of the invention with from 0 to 70% by weight of other components such as filler, for instance fibrous filler, glass filler, colourants and the like. Preferably the composition of the casing comprises no other PAEK or PEEK, more preferably no other polymer.

The present invention also provides a pack comprising the copolymer of the first aspect of invention, preferably in the form of powder, pellets and/or granules.

The pack may include at least 1 kg, suitably at least 5 kg, preferably at least 10 kg, more preferably at least 14 kg of material of the polymeric material. The pack may include 1000 kg or less, preferably 500 kg or less of the polymeric material. Preferred packs include 10 to 500 kg of the polymeric material.

The pack may comprise packaging material (which is intended to be discarded or re-used) and a desired material (which suitably comprises the polymeric material). The packaging material preferably substantially fully encloses the desired material. The packaging material may comprise a first receptacle, for example a flexible receptacle such as a plastics bag in which the desired material is arranged. The first receptacle may be contained within a second receptacle for example in a box such as a cardboard box.

The invention also provides a pipe or sheath formed from a composition comprising or consisting of the copolymer according to the first aspect of the invention.

The invention also provides a method for forming a pipe or sheath by extrusion of a composition comprising or consisting of the copolymer according to the first aspect of the invention.

Specific embodiments of the invention will now be described.

Copolymers were prepared as described in Example 1 to 32. In the preparations, the progress of the copolymerisation was monitored by measuring the torque applied to the reaction stirrer. As the copolymer molecular weight (degree of polymerisation) increases, the torque rises. The reaction was terminated, as explained below, when a target torque was reached, or after 60 minutes if the target torque was not reached by then. As the polymer molecular mass increases, so does the solution viscosity in the reaction mixture, resulting in an increase in torque at the reaction stirrer. The target torque was a value which would have been expected to give an MV for PEEK from around 0.15 to around 0.45 kNsm$^{-2}$ under similar reaction conditions for preparation of PEEK. Examples 34 and 35 provide details on procedures and tests undertaken on the copolymers of the Examples.

The copolymers of Examples 1 to 3 are not according to the invention, whereas the copolymers of Examples 4 to 32 are according to the invention.

Example 1—Preparation of 0.5 mol Polyetheretherketone PEEK-PEDEK Copolymer ($R_{PEEK}$:$R_{PEDEK}$=90:10)

A 0.5 litre flanged flask fitted with a ground glass lid, stirrer/stirrer guide, nitrogen inlet and outlet was charged with 4,4'-difluorobenzophenone (111.56 g, 0.511 mol), 1,4-dihydroxybenzene (49.55 g, 0.450 mol), 4,4'-dihydroxydiphenyl (9.31 g, 0.050 mol) and diphenylsulphone (314.94 g) and purged with nitrogen for 1 hour. The contents were then heated under a nitrogen blanket to 150° C. to form an almost colourless solution. While maintaining a nitrogen blanket, dried sodium carbonate (53.42 g, 0.504 mol) and potassium carbonate (2.764 g, 0.02 mol), both sieved through a screen with a mesh size of 500 micrometres, were added. The temperature was raised to 180° C. at 1° C./min and held for 100 minutes. The temperature was raised to 200° C. at 0.5° C./min; the temperature was then raised to 305° C. at 1° C./min and held for approximately 60 minutes or until the desired degree of polymerisation was reached as indicated by the torque rise on the stirrer. The reaction mixture was then poured into a foil tray, allowed to cool, milled and washed with 2 litres of acetone and then with warm water at a temperature of 40-50° C. until the conductivity of the waste water was <2 µS. The resulting polymer powder was dried in an air oven for 12 hours at 120° C.

Examples 2 to 3—Preparation of Further PEEK-PEDEK Copolymers

The procedure described in Example 1 was repeated except that the quantities of 1,4-dihydroxybenzene and 4,4'-dihydroxydiphenyl were varied to provide polyetheretherketone (PEEK)—polyetherdiphenyletherketone (PEDEK) copolymers of ratios of PEEK components relative to PEDEK components as shown in Table 1.

TABLE 1

| Example | $R_{PEEK}$:$R_{PEDEK}$ | Mass of 1,4-dihydroxybenzene (g) | Mass of 4,4'-dihydroxydiphenyl (g) |
| --- | --- | --- | --- |
| 2 | 75:25 | 41.29 | 23.38 |
| 3 | 60:40 | 33.03 | 37.24 |

Example 4 to 9—Preparation of PEEK-oPEEK-PEDEK Copolymer Including 1,2-dihydroxybenzene as Comonomer (Providing $R_{oPEEK}$ Repeat Units)

The procedure described in Example 1 was repeated except that 1,2-dihydroxybenzene was used in conjunction with 1,4-dihydroxybenzene with the total ratio of dihydroxybezene to 4,4'-dihydroxydiphenyl being varied to provide polyetheretherketone PEEK-oPEEK-PEDEK copolymers with ratios of PEEK:oPEEK:PEDEK repeat units as set out in Table 2.

TABLE 2

| Example | Ratio of $R_{PEEK}$:$R_{oPEEK}$:$R_{PEDEK}$ | Mass of 1,4-dihydroxybenzene (g) | Mass of 1,2-dihydroxybenzene (g) | Mass of 4,4'-dihydroxydiphenyl (g) |
| --- | --- | --- | --- | --- |
| 4 | 80:10:10 | 44.04 | 5.51 | 9.31 |
| 5 | 60:30:10 | 33.03 | 16.52 | 9.31 |
| 6 | 50:10:40 | 27.53 | 5.51 | 37.24 |
| 7 | 30:30:40 | 16.52 | 16.52 | 37.24 |
| 8 | 65:10:25 | 35.79 | 5.51 | 23.28 |
| 9 | 55:20:25 | 30.28 | 11.01 | 23.28 |

Examples 10 to 13—Preparation of PEEK-mPEEK-PEDEK Copolymer Including 1,3-dihydroxybenzene Comonomer (Providing $R_{mPEEK}$ Repeat Units)

The procedure described in Example 1 was repeated except that 1,3-dihydroxybenzene was used in conjunction with 1,4-dihydroxybenzene and the total ratio of dihydroxybezene to 4,4'-dihydroxydiphenyl was varied to provide PEEK-mPEEK-PEDEK copolymers with ratios oPEEK:mPEEK:PEDEK components as set out in Table 3.

TABLE 3

| Example | Ratio of $R_{PEEK}{:}R_{mPEEK}{:}R_{PEDEK}$ | Mass of 1,4-dihydroxybenzene (g) | Mass of 1,3-dihydroxybenzene (g) | Mass of 4,4'-dihydroxydiphenyl (g) |
|---|---|---|---|---|
| 10 | 80:10:10 | 44.04 | 5.51 | 9.31 |
| 11 | 50:10:40 | 27.53 | 5.51 | 37.24 |
| 12 | 30:30:40 | 16.52 | 16.52 | 37.24 |
| 13 | 65:10:25 | 35.79 | 5.51 | 23.28 |

Example 14—Preparation of PEEK-mPEEK-oPEEK-PEDEK copolymer including both 1,3-dihydroxybenzene comonomer (providing $R_{mPEEK}$ repeat units) and 1,2-dihydroxybenzene comonomer (providing $R_{oPEEK}$ repeat units)

In this Example, both 1,3-dihydroxybenzene and 1,2-dihydroxybenzene comonomers were used in conjunction with 1,4-dihydroxybenzene to provide a PEEK-mPEEK-oPEEK-PEDEK copolymer with:

$R_{PEEK}{:}R_{mPEEK}{:}R_{oPEEK}{:}R_{PEDEK}=65/5/5/25$.

A 0.5 litre flanged flask fitted with a ground glass lid, stirrer/stirrer guide, nitrogen inlet and outlet was charged with 4,4'-difluorobenzophenone (111.56 g, 0.511 mol), 1,4-dihydroxybenzene (35.79 g, 0.330 mol), 1,3-dihydroxybenzene (2.75 g, 0.03 mol), 1,2-dihydroxybenzene (2.75 g, 0.03 mol), 4,4'-dihydroxydiphenyl (23.28 g, 0.125 mol) and diphenylsulphone (314.94 g) and purged with nitrogen for 1 hour. The contents were then heated under a nitrogen blanket to 150° C. to form an almost colourless solution. While maintaining a nitrogen blanket, dried sodium carbonate (53.42 g, 0.504 mol) and potassium carbonate (2.764 g, 0.02 mol), both sieved through a screen with a mesh size of 500 micrometres, were added. The temperature was raised to 180° C. at 1° C./min and held for 100 minutes. The temperature was raised to 200° C. at 0.5° C./min; the temperature was then raised to 305° C. at 1° C./min and held for approximately 60 minutes or until the desired MV was reached as indicated by the torque rise on the stirrer. The reaction mixture was then poured into a foil tray, allowed to cool, milled and washed with 2 litres of acetone and then with warm water at a temperature of 40-50° C. until the conductivity of the waste water was <2 µS. The resulting polymer powder was dried in an air oven for 12 hours at 120° C.

Example 15—Preparation of PEEK-PEDEK Copolymer Including 1,2-dihydroxybenzene Comonomer (Providing $R_{oPEEK}$ Repeat Units)—Reaction Terminated Using Lithium Salt and the Copolymer End-Capped In this Example, 1,2-dihydroxybenzene comonomer was used in conjunction with 1,4-dihydroxybenzene to provide a PEEK-oPEEK-PEDEK copolymer with:

$R_{PEEK}{:}R_{oPEEK}{:}R_{PEDEK}=65/10/25$.

The reaction was stopped, once a desired torque/MV was reached, using addition of lithium sulphate, followed by use of 4,4'-difluorobenzophenone to provide the copolymer with fluorobenzophenone end units:

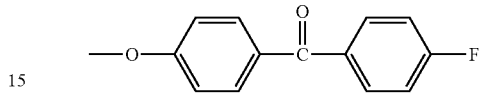

A 0.5 litre flanged flask fitted with a ground glass lid, stirrer/stirrer guide, nitrogen inlet and outlet was charged with 4,4'-difluorobenzophenone (110.19 g, 0.505 mol), 1,4-dihydroxybenzene (35.79 g, 0.330 mol), 1,2-dihydroxybenzene (5.51 g, 0.05 mol) 4,4'-dihydroxydiphenyl (23.28 g, 0.125 mol) and diphenylsulphone (303.00 g) and purged with nitrogen for 1 hour. The contents were then heated under a nitrogen blanket to 150° C. to form an almost colourless solution. While maintaining a nitrogen blanket, dried sodium carbonate (54.58 g, 0.515 mol) and potassium carbonate (0.35 g, 0.0025 mol), both sieved through a screen with a mesh size of 500 micrometres, were added. The temperature was raised to 270° C. at 1° C./min and then held until the desired torque rise was reached, when lithium sulphate (0.96 g, 0.00875 mol) and 4,4'-difluorobenzophenone (1.36 g, 0.00625 mol) were added. The reaction mixture was held at 270° C. for a further 30 minutes. The reaction mixture was then poured into a foil tray, allowed to cool, milled and washed with 2 litres of acetone and then with warm water at a temperature of 40-50° C. until the conductivity of the waste water was <2 µS. The resulting polymer powder was dried in an air oven for 12 hours at 120° C.

Example 16—Preparation of PEEK-mPEEK-PEDEK) Copolymer Including 1,3-dihydroxybenzene Comonomer (Providing $R_{mPEEK}$)—Reaction Terminated Using Lithium Salt and the Copolymer End-Capped In this Example, 1,3-dihydroxybenzene comonomer was used in conjunction with 1,4-dihydroxybenzene to provide a PEEK-mPEEK-PEDEK) copolymer with:

$R_{PEEK}{:}R_{mPEEK}{:}R_{PEDEK}=65/10/25$.

The reaction was stopped, once a desired torque/MV was reached, using addition of lithium sulphate, followed by use of 4,4'-diflurobenzophenone to provide end-capping of the copolymer with fluorobenzophenone end-capping units:

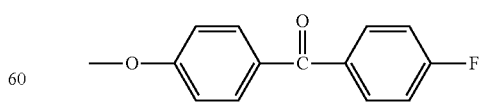

A 0.5 litre flanged flask fitted with a ground glass lid, stirrer/stirrer guide, nitrogen inlet and outlet was charged with 4,4'-difluorobenzophenone (110.19 g, 0.505 mol), 1,4-dihydroxybenzene (35.79 g, 0.330 mol), 1,3-dihydroxybenzene (5.51 g, 0.05 mol) 4,4'-dihydroxydiphenyl (23.28 g, 0.125 mol) and diphenylsulphone (303.00 g) and purged with nitrogen for 1 hour. The contents were then heated under a nitrogen blanket to 150° C. to form an almost colourless solution. While maintaining a nitrogen blanket, dried sodium carbonate (54.58 g, 0.515 mol) and potassium carbonate (0.35 g, 0.0025 mol), both sieved through a screen with a mesh size of 500 micrometres, were added. The temperature was raised to 270° C. at 1° C./min and then held until the desired torque rise was reached, when lithium sulphate (0.96 g, 0.00875 mol) and 4,4'-difluorobenzophenone (1.36 g, 0.00625 mol) were added. The reaction mixture was held at 270° C. for a further 30 minutes. The reaction mixture was then poured into a foil tray, allowed to cool, milled and washed with 2 litres of acetone and then with warm water at a temperature of 40-50° C. until the conductivity of the waste water was <2 µS. The resulting polymer powder was dried in an air oven for 12 hours at 120° C.

Example 17—Differential Scanning Calorimetry of the Copolymers of Examples 1 to 16

Crystallinity (as reported in Table 2) may be assessed by several methods for example by density, by IR spectroscopy, by X-ray diffraction or by differential scanning calorimetry (DSC). The DSC method was been used to evaluate the crystallinity that developed in the polymers from Examples 1-20 using a Mettler Toledo DSC1 Star system with FRS5 sensor.

The Glass Transition Temperature (Tg), the Melting Temperature (Tm) and Heat of Fusion of Melting ($\Box$Hm) for the polymers from Examples 1 to 19 were determined using the following DSC method.

A dried sample of each polymer was compression moulded into an amorphous film, by heating 7 g of polymer in a mould at 400° C. under a pressure of 50 bar for 2 minutes, then quenching in cold water producing a film of dimensions 120×120 mm, with a thickness in the region of 0.20 mm. An 8 mg plus or minus 3 mg sample of each film was scanned by DSC as follows:

Step 1 Perform and record a preliminary thermal cycle by heating the sample from 50° C. to 400° C. at 20° C./min.
Step 2 Hold for 5 minutes.
Step 3 Cool at 50° C./min to a point halfway between the $Tg^1$ and $Tm^1$ as recorded in the first cycle ($Tg^1$ is the point of greatest slope obtained during the glass transition on heating in step 1. The $Tm^1$ was the temperature at which the main peak of the melting endotherm reached a maximum value in step 1).
Step 4 Hold for 3 hours
Step 5 Cool at 50° C./min to 50° C. and hold for 5 minutes
Step 6 Re-heat from 50° C. to 400° C. at 20° C./min, recording the Tg, Tm and $\Box$Hm for this second heating endotherm.

From the DSC trace resulting from the scan in step 6, Tg was obtained as the temperature at which the endotherm slope was a maximum during the glass transition. The Tm was the temperature at which the main peak of the melting endotherm reached a maximum value.

The heat of fusion for melting ($\Box$Hm) was obtained by connecting the two points at which the melting endotherm in step 6 deviated from the relatively straight baseline above the Tg. The integrated area under the endotherm as a function of time yields the enthalpy of the melting transition. The mass normalised heat of fusion is calculated by dividing the enthalpy by the mass of the specimen (J/g). The level of crystallisation (%) is determined by dividing the Heat of Fusion of the specimen by 130 J/g. This value of 130 J/g is the heat of fusion for totally crystalline PEEK, which is used as a reference value for this measurement.

The results are set out in Table 4 below.

Example 18—Thermal Gravimetric Analysis of Polyaryletherketones of Examples 1 to 16

The thermal stability of a polymer can be measured by assessment of the temperature by which 5 weight % of the polymer mass is lost (Td5) as the temperature is raised from room temperature to 1000° C. at a constant rate in air. Td5 is suitably measured by means of thermal gravimetric analysis (TGA). The TGA method was used to measure Td5 using a TA instruments TGA Q5000 with tared platinum plans in air. The temperature was raised from room temperature up to 1000° C. at a rate of 50° C. per minute decreasing to 1° C. per minute when 0.1% weight loss from the sample has been detected.

The Results are set out in table 4 below, with the Examples grouped together with other Examples having the same overall ($R_{PEEK}+R_{oPEEK}+R_{mPEEK}$):$R_{PEDEK}$ ratios.

TABLE 4

| Example | Polymer | Tg (° C.) | Tm (° C.) | X % | Td5 (° C.) |
|---|---|---|---|---|---|
| 1 | PEEK-PEDEK (90/10) | 143 | 332 | 34 | 508 |
| 4 | PEEK-oPEEK-PEDEK (80/10/10) | 140 | 313 | 30 | 533 |
| 5 | PEEK-oPEEK -PEDEK (60/30/10) | 142 | 263 | 20 | 523 |
| 10 | PEEK-mPEEK -PEDEK (80/10/10) | 145 | 310 | 28 | 536 |
| 2 | PEEK-PEDEK (75/25) | 151 | 306 | 26 | 537 |
| 8 | PEEK-oPEEK -PEDEK (65/10/25) | 152 | 281 | 24 | 536 |
| 15 | PEEK-oPEEK -PEDEK (65/10/25) End-capped | 152 | 281 | 22 | 533 |
| 9 | PEEK-oPEEK -PEDEK (55/20/25) | 148 | 263 | 18 | 522 |
| 13 | PEEK-mPEEK -PEDEK (65/10/25) | 152 | 283 | 25 | 526 |
| 16 | PEEK-mPEEK-PEDEK (65/10/25) End-capped | 152 | 281 | 25 | 539 |
| 14 | PEEK-mPEEK-oPEEK-PEDEK (65/05/05/25) | 153 | 278 | 22 | 531 |
| 3 | PEEK-PEDEK (60/40) | 152 | 318 | 19 | 543 |
| 6 | PEEK-oPEEK-PEDEK (50/10/40) | 150 | 307 | 16 | 537 |
| 7 | PEEK-oPEEK-PEDEK (30/30/40) | 151 | 306 | 13 | 520 |
| 11 | PEEK-mPEEK-PEDEK (50/10/40) | 150 | 315 | 25 | 537 |
| 12 | PEEK-mPEEK-PEDEK (30/30/40) | 147 | 305 | 18 | 536 |

It can be seen from Table 4 that the modification of a PEEK-PEDEK copolymer of a particular $R_{PEEK}:R_{PEDEK}$, by replacement of part of the $R_{PEEK}$ units with $R_{mPEEK}$ and/or $R_{oPEEK}$ units leads to:
i) significant reductions in Tm;
ii) some reductions in Tg;
iii) some reductions in crystallinity, but with significant crystallinity still present; and
iv) little effect on Td5.

In summary, the invention provides copolymers which include [-ether-phenyl-ether-phenyl-carbonyl-phenyl-] ($R_{PEEK}$) and [ether-phenyl-phenyl-ether-phenyl-carbonyl-phenyl-] ($R_{PEDEK}$) repeat units, have their melting temperature reduced by partially replacing the para-$R_{PEEK}$ units by $R_{oPEEK}$ and/or $R_{mPEEK}$ units, in which the ether-phenyl-ether moieties are ortho- and meta-rather than para-. The copolymers exhibit crystallinity and have similar glass transition temperatures to the prior art polymers without partial para-replacement. Methods of preparation and uses of the copolymers are also disclosed.

Example 19—Preparation of PEEK-oPEEK-PEDEK Copolymer including 1,2-dihydroxybenzene as Comonomer (Providing $R_{oPEEK}$ Repeat Units)

The procedure described in Example 1 was repeated except that 1,2-dihydroxybenzene was used in conjunction with 1,4-dihydroxybenzene with the total ratio of dihydroxybezene to 4,4'-dihydroxydiphenyl being varied to provide polyetheretherketone PEEK-oPEEK-PEDEK copolymers with ratios of PEEK:oPEEK:PEDEK repeat units as set out in Table 5.

TABLE 5

| Example | Ratio of $R_{PEEK}:R_{oPEEK}:R_{PEDEK}$ | Mass of 1,4-dihydroxybenzene (g) | Mass of 1,2-dihydroxybenzene (g) | Mass of 4,4'-dihydroxydiphenyl (g) |
|---|---|---|---|---|
| 19 | 65:15:20 | 35.79 | 8.26 | 18.62 |

TABLE 6

| Example | Polymer | Tg (° C.) | Tm (° C.) | X % | Td5 (° C.) |
|---|---|---|---|---|---|
| 19 | PEEK-oPEEK-PEDEK 65:15:20 | 144 | 281 | 26 | 517 |

Example 19 provides a polymeric material with significant reduction in Tm compared to PEEK-PEDEK copolymer, some reduction in Tg compared to PEEK-PEDEK copolymer and comparable levels of crystallinity as shown in Table 6.

Example 20 and 21 Preparation of PEEK-oPEEK-PEDEK Copolymer Including 1,2-dihydroxybenzene as Comonomer (Providing $R_{oPEEK}$ Repeat Units) with the Addition of Victrex ST45PF (PEKEKK) at the End of the Reaction In Example 20, the procedure described in Example 1 was repeated except that 1,2-dihydroxybenzene was used in conjunction with 1,4-dihydroxybenzene with the total ratio of dihydroxybezene to 4,4'-dihydroxydiphenyl being varied to provide polyetheretherketone PEEK-oPEEK-PEDEK copolymers with ratios of PEEK:oPEEK:PEDEK repeat units as set out in Table 5.

In Example 21, the polymeric material was made as per example 19, and an additive was added to the polymeric material at the end of the reaction to increase the rate of crystallisation of the polymeric material. Victrex ST45PF at a quantity of 7.59 g (available from Victrex Manufacturing Limited, Victrex Technology Centre, Hillhouse International, Thornton Cleveleys, FY5 4QD, UK) was added to the polymeric material, ten minutes after the torque rise has ceased. After a further ten minutes of stirring, the reaction mixture was then poured into a foil tray and allowed to cool, milled and washed as per the procedure in Example 1. Victrex ST45PF is PEKEKK, polyetherketoetherketoneketone.

TABLE 7

| Example | Ratio of $R_{PEEK}:R_{oPEEK}:R_{PEDEK}$ | Mass of 1,4-dihydroxybenzene (g) | Mass of 1,2-dihydroxybenzene (g) | Mass of 4,4'-dihydroxydiphenyl (g) | Mass of ST45P F (g) |
|---|---|---|---|---|---|
| 20 | 65:15:20 | 35.79 | 8.26 | 18.62 | 0 |
| 21 | 65:15:20 | 35.79 | 8.26 | 18.62 | 7.59 |

The results are set out in Table 8 below.

TABLE 8

| Example | Polymer | Tg (° C.) | Tm (° C.) | Tc (° C.) | X % |
|---|---|---|---|---|---|
| 20 | PEEK-oPEEK-PEDEK 65:20:15 | 145 | 280 | 225 | 26 |
| 21 | PEEK-oPEEK-PEDEK 65:20:15 + 5% wt. ST45PF | 144 | 279 | 232 | 23 |

It has been surprisingly found that the additive, Victrex ST45PF results in an increase in the rate of crystallisation as indicated by the increase in Tc. Without being bound by theory, it is believed that the ST45PF powder particles act as a nucleation site and therefore increases the rate of crystallisation of the polymeric material through heterogeneous crystallisation. A benefit of increasing the rate of crystallisation is that the polymeric material may used in a variety of manufacturing methods including those that require fast crystallising properties such as injection moulding.

Example 22

The procedure described in example 8 was repeated on a larger scale, 450 L jacketed steel vessel.

Diphenylsulphone (99.6 kg) was charged to the vessel and allowed to melt. When the contents were molten and 140-150° C., agitation was set to 20 rpm and the following materials charged sequentially: 1,4-dihydroxybenzene (11.451 kg, 104.0 moles), 1,2-dihydroxybenzene (2.643 kg, 24.0 moles), 4,4'-dihydroxydiphenyl (5.959, 32.0 moles) and 4,4'-difluorobenzophenone (35.715 kg, 163.7 moles). When the contents temperature was 140-150° C., a mixture of sodium carbonate (17.094 kg, 161.3 moles) and potassium carbonate (1.106 kg, 8.0 moles), pre-sieved through 500 μm mesh, were added to the vessel.

The agitation rate was increased to 50 rpm and contents temperature raised to 200° C. at 0.3° C. min-1 and then raised to 305° C. at 1° C. min-1. The temperature was maintained at 305° C. until sufficient viscosity was attained. The molten mixture was discharged from the reactor over approximately 45 minutes and the solidified material milled to a coarse powder (<2 mm maximum dimension). The powder was transferred to a column where acetone was percolated through until the leaching solvent no longer yielded a precipitate on addition of water. The product was then washed with deionised water at 50° C. to remove aqueous by-products. Once the conductivity of leachate was measured to be <2 μS using a conductivity probe, the material remaining in the column was discharged and dried in an air circulatory oven at 150° C.

Example 23

Example 22 was repeated but with a reduced 4,4'-diflurobenzophenone charge of 35.505 kg.

Example 24

Example 22 was repeated but with diphenylsulphone charge of 76.439 kg.

Example 25

Example 24 was repeated but at the end of the polymerisation reaction, fine ST 45PF powder (PEKEKK), 2.42 kg, was added to the reaction mixture. The mixture was stirred for a further 30 minutes and then discharged and worked up as previously described for Example 22.

Example 26

Example 24 was repeated but with a reduced 4,4'-difluorobenzophenone charge of 35.505 kg.

Example 27

Example 25 was repeated but with a reduced 4,4'-difluorobenzophenone charge of 35.505 kg.

Example 28 Preparation of 12 kg of Polyaryletherketones of Example 22 with the Addition of Victrex ST45PF (PEKEKK) During Melt Processing In Example 28, the polymeric material was made as per Example 22. An additive was then added to the polymeric material during a subsequent melt processing step to increase the rate of crystallisation of the polymeric material. Victrex ST45PF at a quantity of 600 g (available from Victrex Manufacturing Limited, Victrex Technology Centre, Hillhouse International, Thornton Cleveleys, FY5 4QD, UK) was added to 11.4 kg of the polymeric material through separate loss-in-weight feeders into the rear feeding section of a Coperion ZSK25 twin screw extruder with barrel temperatures of 310 to 320° C. The resulting mixture was then extruded into two 4 mm diameter laces and allowed to cool on a conveyor belt before being granulated into granules of 2.0-4.0 mm in length.

Example 29 Preparation of 12 kg of Polyaryletherketones of Example 23 with the Addition of Victrex ST45PF (PEKEKK) During Melt Processing In Example 29 the polymeric material was made as per Example 23. An additive was then added to the polymeric material during a subsequent melt processing step to increase the rate of crystallisation of the polymeric material. Victrex ST45PF at a quantity of 600 g (available from Victrex Manufacturing Limited, Victrex Technology Centre, Hillhouse International, Thornton Cleveleys, FY5 4QD, UK) was added to 11.4 kg of the polymeric material through separate loss-in-weight feeders into the rear feeding section of a Coperion ZSK25 twin screw extruder with barrel temperatures of 310 to 320° C. The resulting mixture was then extruded into two 4 mm diameter laces and allowed to cool on a conveyor belt before being granulated into granules of 2.0-4.0 mm in length.

Example 30 Preparation of 5 kg of Polyaryletherketones of Example 22 with the Addition of Hytrel 5555HS (TPC-ET) During Melt Processing In Example 30 the polymeric material was made as per Example 22. An additive was then added to the polymeric material during a subsequent melt processing step to reduce the stiffness and improve the impact performance of the polymeric material. Hytrel 5555HS at a quantity of 500 g (available from Dupont, 974 Centre Road, Wilmington, DE 19805, USA) was added to 4.5 kg of the polymeric material through separate loss-in-weight feeders into the rear feeding section of a Coperion ZSK25 twin screw extruder with barrel temperatures of 290° C. The resulting mixture was then extruded into two 4 mm diameter laces and allowed to cool on a conveyor belt before being granulated into granules of 2.0-4.0 mm in length.

Example 31 Preparation of 5 kg of Polyaryletherketones of Example 22 with the Addition of Hytrel 5555HS (TPC-ET) During Melt Processing In Example 31 the polymeric material was made as per Example 22. An additive was then added to the polymeric material during a subsequent melt processing step to reduce the stiffness and improve the impact performance of the polymeric material. Hytrel 5555HS at a quantity of 1.0 kg (available from Dupont, 974 Centre Road, Wilmington, DE 19805, USA) was added to 4.0 kg of the polymeric material through separate loss-in-weight feeders into the rear feeding section of a Coperion ZSK25 twin screw extruder with barrel temperatures of 290° C. The resulting mixture was then extruded into two 4 mm diameter laces and allowed to cool on a conveyor belt before being granulated into granules of 2.0-4.0 mm in length.

Example 32 Preparation of 5 kg of Polyaryletherketones of Example 22 with the addition of Siltem 1500 (PEI-siloxane copolymer) and UItem 1000 (PEI) During Melt Processing In Example 32 the polymeric material was made as per Example 22. Two additives were then added to the polymeric material during a subsequent melt processing step to reduce the stiffness and improve the impact performance of the polymeric material. Siltem 1500 at a quantity of 500 g and UItem 1000 at a quantity of 250 g (both available from Sabic, SAUDI BASIC INDUSTRIES CORPORATION (HQ), PO Box 5101, Riyadh 11422, Saudi Arabia ( ) was added to 4.25 kg of the polymeric material through separate loss-in-weight feeders into the rear feeding section of a Coperion ZSK25 twin screw extruder with barrel temperatures of 290° C. The resulting mixture was then extruded into two 4 mm diameter laces and allowed to cool on a conveyor belt before being granulated into granules of 2.0-4.0 mm in length.

Example 33 Preparation of 5 kg of Polyaryletherketones of Example 22 with the Addition of Siltem 1500 (PEI-siloxane Copolymer) and UItem 1000 (PEI) During Melt Processing In Example 33 the polymeric material was made as per Example 22. Two additives were then added to the polymeric material during a subsequent melt processing step to reduce the stiffness and improve the impact performance of the polymeric material. Siltem 1500 at a quantity of 500 g and UItem 1000 at a quantity of 500 g (both available from Sabic, SAUDI BASIC INDUSTRIES CORPORATION (HQ), PO Box 5101, Riyadh 11422, Saudi Arabia) was added to 4.0 kg of the polymeric material through separate loss-in-weight feeders into the rear feeding section of a Coperion ZSK25 twin screw extruder with barrel temperatures of 290° C. The resulting mixture was then extruded into two 4 mm diameter laces and allowed to cool on a conveyor belt before being granulated into granules of 2.0-4.0 mm in length.

Example 34 Differential Scanning Calorimetry (DSC) on Examples 22, 23, 25, 27, 28 and 29

A further method of Differential Scanning calorimetry (DSC) was utilised to determine melting temperature (Tm), crystallisation temperature (Tc), glass transition temperature (Tg) and heat of fusion (ΔH) in accordance with ISO 11357 for Examples 22, 23, 25, 27, 28 and 29. Instrument used was TA Instrument Q200.

The heat cycles were:
1st heat cycle: 50.0° C. to 320.0° C. at 20.0° C., isothermal for 5 minutes
1st cool cycle*: 320.0° C. to 50.0° C. at 20.0° C., isothermal for 5 minutes
2nd heat cycle: 50.0° C. to 320.0° C. at 20.0° C., isothermal for 5 minutes The Tm was the peak temperature at which the melting endotherm on the 2nd heat scan reached a maximum value.

The Tc was obtained as the peak temperature of the crystallisation exotherm on the first cool scan.

Glass transition temperature (Tg), onset and mid-point was determined on the 2nd heat scan. The enthalpy of fusion, ΔH, was determined on the 2nd heat scan and the area was calculated by drawing a linear baseline from just above the Tg (157° C.) to a temperature above the last endotherm.

The mass normalised heat of fusion is calculated by dividing the enthalpy by the mass of the specimen (J/g). The level of crystallisation (%) is determined by dividing the Heat of Fusion of the specimen by 130 J/g. This value of 130 J/g is the heat of fusion for totally crystalline PEEK, which is used as a reference value for this measurement.

Table 9 shows the Glass Transition Temperature (Tg), the Melting Temperature (Tm) and Tc which is measured on the cooling cycle and is the temperature at which the crystallisation exotherm reaches a minimum. The Heat of Fusion for melting (ΔHm) was obtained by connecting the two points at which the melting endotherm deviates from the relatively straight baseline. The integrated area under the endotherm as a function of time yields the enthalpy (mJ) of the melting transition: the mass normalised heat of fusion is calculated by dividing the enthalpy by the mass of the specimen (J/g). The level of crystallisation (X(%)) is determined by dividing the Heat of Fusion of the specimen by the Heat of Fusion of a totally crystalline polymer, which for the copolymer is 130 J/g.

As can be seen, there is a significant reduction in the melting temperature of the copolymer compared to Victrex PEEK 150G and Victrex PEEK 450G. This results in a more processable material at lower temperatures, and also opens up the possibility of using additives in combination with the copolymer that would not be applicable for use in PEEK polymers due to the high processing temperatures needed to process PEEKs.

TABLE 9 material properties of Examples 22 and 23 and comparative examples from DSC

|  | Tg (° C.) | Tm (° C.) | Tc (° C.) | Crystallinity (%) |
|---|---|---|---|---|
| 150G | 144 | 344 | 301 | 34.7 |
| Example 22 | 147 | 282 | 222 | 22 |
| 450G | 144 | 343 | 290 | 32.8 |
| Example 23 | 147 | 278 | 207 | 15.9 |

Examples 25, 27, 28 and 29 are copolymer compositions with added Victrex ST45PF (Victrex ST45PF is PEKEKK, polyetherketonetherketoneketone). Victrex ST45PF has a melting temperature of around 387° C. By adding ST45PF, the inventors have been able to make polymeric materials with reduced crystallisation times as shown in Table 10. The effect of this is that the compositions crystallise far more quickly than the copolymer on its own. One benefit of increasing the cystallisation rate of the copolymer is that when making parts from the copolymer, moulding cycle times may be increased, thereby increasing the number of parts manufactured per minute.

TABLE 10 crystallisation behaviour from Examples 25, 27, 28 and 29

|  | Tm (° C.) | Tc (° C.) | Crystallinity (%) | Isothermal Crystallisation time at 260° C. (mins) |
|---|---|---|---|---|
| Example 22 | 281.5 | 221.8 | 22 | 10 |
| Example 28 | 283.5 | 231.7 | 22.1 | 6.3 |
| Example 25 | 280.3 | 223.4 | 19.3 | 4.1 |
| Example 23 | 278.2 | 206.9 | 15.9 | 22.1 |
| Example 29 | 279.3 | 226.7 | 17 | 14 |
| Example 27 | 279.1 | 214.6 | 17.2 | 14 |

Example 35—Rheometry

The melt viscosity of the PAEK copolymer may be measured by capillary rheometry using an RH10 capillary rheometer (Malvern Instruments Rosand RH10 capillary rheometer), fitted with a tungsten carbide die, 0.5 mm (capillary diameter)×8.0 mm (capillary length). Approximately 5 grams of the copolymer is dried in an air circulating oven for 3 hours at 150° C. The extruder is allowed to equilibrate to 400° C. The dried polymer is loaded into the heated barrel of the extruder, a brass tip (12 mm long× 9.92±0.01 mm diameter) placed on top of the polymer followed by the piston and the screw manually turned until the proof ring of the pressure gauge just engages the piston to help remove any trapped air. The column of polymer is allowed to heat and melt over a period of at least 10 minutes. After the preheat stage the screw was is in motion so that the melted polymer is extruded through the die to form a thin fibre at the desired shear rate, while recording the pressure (P) required to extrude the polymer. The Melt Viscosity is given by the formula $$\text{Melt Viscosity} = \frac{P\pi r^4}{8LSA} kNsm^{-2}$$

where P=Pressure/kN m$^{-2}$
L=Length of die/m
S=ram speed/ms$^{-1}$
A=barrel cross-sectional area/m$^2$
r=Die radius/m
The relationship between shear rate and the other parameters is given by the equation:

$$\text{Apparent wall shear rate} = 4Q/\pi r^3$$

where Q=volumetric flow rate/m$^3$s$^{-1}$=SA.

Hence, by adjusting the ram speed, S, the viscosity of the molten polymer may be measured at different shear rates, such as at 100, 1000 or 10,000 s$^{-1}$ or at intermediate rates.

Figure 2:
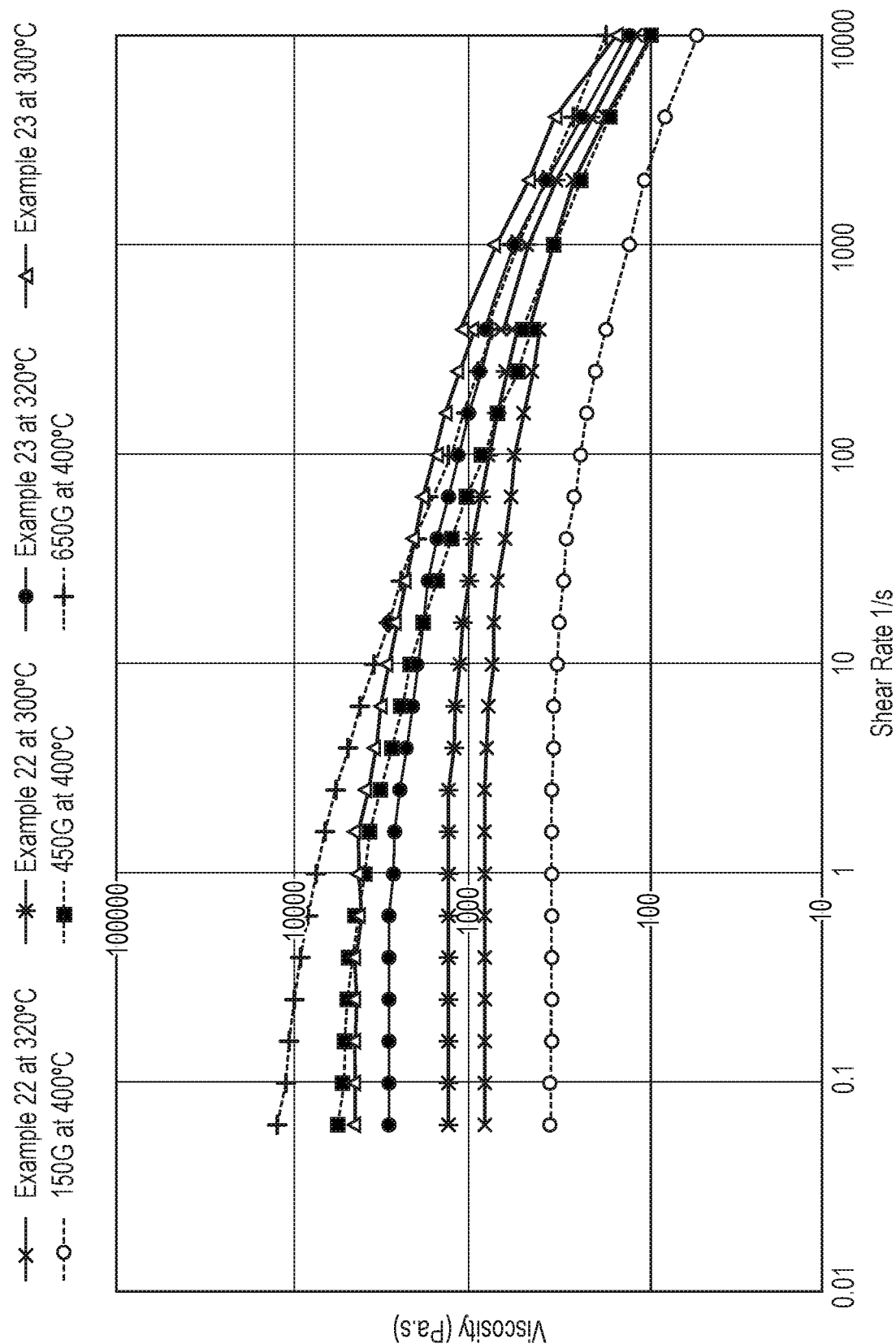

FIGS. 1 and 2 show the shear viscosity behaviour of Examples 22 and 23 using the method described above in Example 35. Comparative examples are also shown including comparative shear rheology information for Victrex 150G and Victrex 450G (available from Victrex Manufacturing Limited, Victrex Technology Centre, Thornton Cleveleys, UK). Comparative examples from other PAEK suppliers are also shown (for example KT880 from Solvay Speciality Polymers USA, LLC, 4500 McGinnis Ferry Road, Alpharetta, Georgia, USA, and L4000 from Evonik Industries AG, Rellinghauser Straße 1-11, 45128 Essen, Germany). Examples 22 and 23 exhibit flow properties between that of comparative polyetheretherketones The low shear rate viscosity (between 0.006 s$^{-1}$ and 628.319 s$^{-1}$) of polymeric material may be measured using rotational rheometry using a TA Instruments™ Discovery Hybrid Rheometer-2 (DHR-2) rotational rheometer. The rheometer was fitted with an Environmental Test Chamber (ETC), a 25 mm Stainless Steel Parallel Plate and a 25 mm Stainless Steel Stepped Lower ETC Plate. Approximately 1.6 grams of the copolymer was dried in an air circulating oven for 3 hours at 150° C. The extruder was allowed to equilibrate to the testing temperature (typically 300-400° C.).

The dried copolymer was loaded into a melt ring wrapped around the stepped section on the lower plate and once the temperature of the chamber had returned to the test temperature, a delay of three minutes was sufficient to melt the copolymer, upon which the melt ring was removed. The gap between the two plates was closed at a rate of 200 µm/s until the gap size was 1075 µm. After a further two minutes delay, the excess polymeric material was removed from the gap using a 6 mm trimming tool. Once trimmed, the gap was closed to 1000 µm again at a rate of 200 µm/s before starting the test.

The Viscosity is given by the formula:

$$\text{Viscosity } (\eta) = \frac{MK_\sigma}{\Omega K_\gamma} \text{Pa} \cdot s$$

where:
M=torque/Nm$^{-1}$
K$_\sigma$=Stress Constant
Ω=Motor angular velocity/rad s$^{-1}$
K$_\gamma$=Strain Constant.
For a parallel plate, the $$\text{strain constant} = \frac{r}{h}$$

where:
r=radius of the plate/m
h=the gap size/m.
For a parallel plate the $$\text{stress constant} = \frac{2}{\pi r^3}$$

where:
r=radius of the plate/m.

To determine the shear viscosity across a range of shear rates, a dynamic oscillation experiment was performed. The torque is kept at a constant value and the frequency is swept from high to low (typically from 100 Hz to 0.01 Hz) logarithmically at 5 points per decade. The complex viscosity is determined to be:

$$\text{Complex Viscosity } (\eta^*) = \frac{G^*}{\omega} \text{Pa} \cdot s$$

where:
$G^*$=Complex Modulus/Pa
$\omega$=Angular Frequency/rad s$^{-1}$.

The complex viscosity can be converted to viscosity via the Cox-Merz rule to give a viscosity as a function of shear rate.

Cox-Merz Rule for Linear Polymers: $\eta^*(\omega)=\eta(\gamma)@\gamma=\omega$ where $\gamma$=shear rate/s$^{-1}$.

FIG. 2 shows the rheological properties of Examples 22 and 23, compared with Victrex PEEK 150G, Victrex PEEK 450G and Victrex PEEK 650G (all available from Victrex Manufacturing Limited). Copolymers according to the present invention exhibit similar flow behaviour to known PEEKs.

Example 36—Mechanical Properties

The mechanical properties of the compositions of Examples 22, 23, 26, 30 and 32 were tested according to ISO standards ISO 527 for tensile properties, ISO 178 for flexural properties, and ISO 180/A for the impact strength properties using the type 1A (ISO 3167) test bars at 23° C.

Table 11 shows tensile mechanical properties for examples 22, 23 and 26. The copolymer exhibits good tensile strength properties close to that of Victrex PEEK 450G.

TABLE 11 mechanical properties

| | ISO Tensile Modulus, (Youngs) GPa | ISO Tensile Strength, Mpa |
|---|---|---|
| 450G | 3.7 | 98 |
| Example 22 | 3.5 | 90 |
| Example 23 | 3.4 | 82 |
| Example 26 | 3.1 | 90 |

Table 12 shows the mechanical properties for immiscible blends comprising the copolymer and an elastomer, Hytrel 5555HS (TPC-ET). By incorporating a small quantity of Hytrel 5555HS (TPC-ET) into the composition, improved impact resistance has been observed.

TABLE 12 mechanical properties of compositions of immiscible blends

| | ISO Tensile Modulus, (Youngs) GPa | ISO Tensile Strength, MPa | ISO Flexural Modulus, GPa | ISO Flexural Strength MPa | ISO Notched Izod, kJ/m2 |
|---|---|---|---|---|---|
| Example 22 | 3.5 | 89.9 | 3.3 | 149.4 | 2.9 |
| Example 30 | 3.4 | 80.8 | 3.2 | 136.4 | 4.6 |

Table 13 shows the mechanical properties for immiscible blends comprising the copolymer and elastomers, SiItem and UItem. By incorporating a small quantity of SiItem and UItem into the composition, improved impact resistance has been observed.

TABLE 13 mechanical properties of compositions of miscible blends

| | ISO Tensile Modulus, (Youngs) GPa | ISO Tensile Strength, MPa | ISO Flexural Modulus, GPa | ISO Flexural Strength MPa | ISO Notched Izod, kJ/m2 |
|---|---|---|---|---|---|
| Example 22 | 3.5 | 89.9 | 3.3 | 149.4 | 2.9 |
| Example 32 | 3.2 | 72.1 | 3 | 134.2 | 5.5 | and the repeat unit of formula V is:

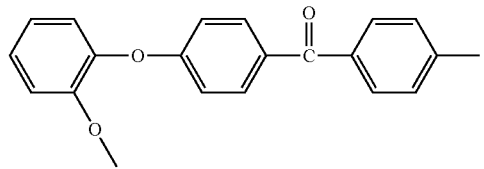

The invention claimed is:
1. A copolymer consisting essentially of repeat units of formula I:

—O-Ph-O-Ph-CO-Ph-   I and repeat units of formula II:

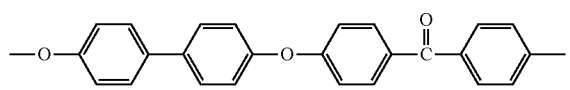

and end units,
wherein the molar ratio of repeat units of formula I to repeat units of formula II is from 55:45 to 95:5; and
wherein the repeat units of formula I consist essentially of 50 to 90 molar % of repeat units of formula III:

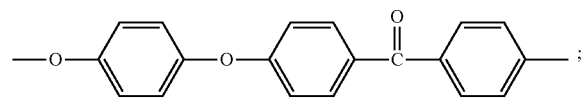

and
10 to 50% by molar % of repeat units which are of formula IV, of formula V or of a mixture thereof;
wherein the repeat unit of formula IV is:

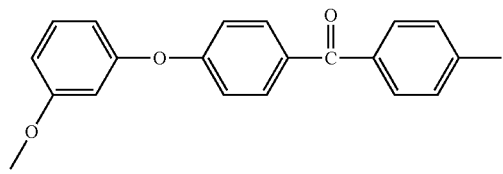

2. A copolymer according to claim 1 wherein the molar ratio of repeat units of formula I to repeat units of formula II is from 60:40 to 90:10.
3. A copolymer according to claim 1 wherein the repeat units of formula I consist essentially of 65 to 90% molar % of repeat units of formula III in combination with 10 to 35 molar % of repeat units which are of formula IV, of formula V, or of a mixture thereof.
4. A copolymer according to claim 3 wherein the repeat units of formula I consist essentially of 80 to 90% molar % of repeat units of formula III in combination with 10 to 20 molar % of repeat units which are of formula IV, of formula V, or of a mixture thereof.
5. A copolymer according to claim 1 wherein the molar ratio of repeat units of formula I to repeat units of formula II is from 90:10 to 80:20 and wherein the repeat units of formula I consist essentially of 80 to 90% molar % of repeat units of formula III in combination with 10 to 20 molar % of repeat units which are of formula IV, of formula V, or of a mixture thereof.
6. A copolymer according to claim 1 wherein the copolymer does not include repeat units of formula IV.
7. A copolymer according to claim 1 wherein the copolymer does not include repeat units of formula V.
8. A copolymer according to claim 1 wherein the end units are the same as the repeat units of the copolymer but terminated with a terminal —OH or —F moiety.
9. A copolymer according to claim 1 wherein the end units include

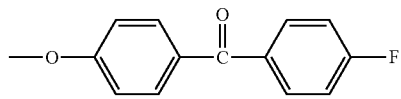 [SMILES: COc1ccc(C(=O)c2ccc(F)cc2)cc1]

as end units in addition to end units which are the same as the repeat units of the copolymer but terminated with a terminal —OH or —F moiety.
10. A process for producing a copolymer according to claim 1, the process comprising polycondensing 4,4'-difluorobenzophenone with a mixture of dihydroxy compounds consisting of 1,4-dihydroxybenzene, 4,4'-dihydroxydiphenyl and at least one of 1,3-dihydroxybenzene and 1,2-dihydroxybenzene; wherein the dihydroxy compounds are in the molar proportions required to provide the copolymer of claim 1;
wherein the molar ratio (4,4'-difluorobenzophenone)/(dihydroxy compounds) is from 1.005 to 1.05; and
wherein the polycondensation is carried out in an aromatic sulfone solvent in the presence of particulate sodium carbonate and potassium carbonate.
11. A process according to claim 10 wherein the polycondensation is stopped with a lithium salt and wherein the copolymer is end-capped by addition of further 4,4'-difluorobenzophenone.

12. A process according to claim 10, wherein either
a) after polycondensation, an additive is added to a reaction mixture and stirred for at least five minutes; and optionally, wherein the additive is a polyaryletherketone, PAEK, the PAEK having a melting temperature of at least 20° C. above a melting temperature of the copolymer, as determined by Differential Scanning calorimetry, wherein the PAEK comprises 0.1% to 10% by total weight of the reaction mixture; or
b) after a purification step, an additive is added to the copolymer in a melt-compounding process to form a composition; and optionally, wherein the additive is a polyaryletherketone, PAEK, the PAEK having a melting temperature of at least 20° C. above a melting temperature of the copolymer, as determined by Differential Scanning calorimetry, wherein the PAEK comprises 0.1% to 10% by total weight of the composition.

13. An additive manufacturing process comprising extruding a filament of the copolymer of claim 1 through a print-head onto a base plate.

14. A method for manufacturing a three-dimensional component from a powder by selective sintering by means of electromagnetic radiation, wherein the powder comprises, consists essentially of, or consists of a copolymer according to claim 1.

15. A powder comprising, consisting essentially of, or consisting of a copolymer according to claim 1 as a building material for manufacture of a three-dimensional component from the powder by selective sintering of the powder by means of electromagnetic radiation.

16. A moulded or extruded component, comprising, consisting essentially of, or consisting of a copolymer according to claim 1.

17. A method of reducing isothermal crystallisation time, where the isothermal crystallisation time is determined by Differential Scanning calorimetry, the method comprising:
a) selecting a copolymer according to claim 1, and selecting a polyaryletherketone, PAEK, the PAEK having a melting temperature at least 20° C. above a melting temperature of the copolymer, and melt processing the copolymer and the PAEK to form a composition, wherein the copolymer comprises 90% to 99.9% by weight of the composition and the PAEK comprises 0.1% to 10% by weight of the composition.

18. A copolymer according to claim 1 wherein the molar ratio of repeat units of formula I to repeat units of formula II is from 70:30 to 90:10.

19. A copolymer according to claim 1 wherein the molar ratio of repeat units of formula I to repeat units of formula II is from 80:20 to 90:10.

* * * * *